United States Patent
Kim et al.

(10) Patent No.: US 12,472,843 B2
(45) Date of Patent: Nov. 18, 2025

(54) BATTERY PACK

(71) Applicant: LG ENERGY SOLUTION, LTD., Seoul (KR)

(72) Inventors: Duk-You Kim, Daejeon (KR); Keun-Wook Lee, Daejeon (KR); Jung-Hoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 596 days.

(21) Appl. No.: 17/777,579

(22) PCT Filed: Aug. 13, 2021

(86) PCT No.: PCT/KR2021/010834
§ 371 (c)(1),
(2) Date: May 17, 2022

(87) PCT Pub. No.: WO2022/035292
PCT Pub. Date: Feb. 17, 2022

(65) Prior Publication Data
US 2022/0396175 A1   Dec. 15, 2022

(30) Foreign Application Priority Data
Aug. 14, 2020 (KR) .................. 10-2020-0102648

(51) Int. Cl.
*B60L 58/18* (2019.01)
*B60L 50/64* (2019.01)
*B60L 58/12* (2019.01)
*H01M 10/42* (2006.01)

(52) U.S. Cl.
CPC ............... *B60L 58/18* (2019.02); *B60L 50/64* (2019.02); *B60L 58/12* (2019.02);
(Continued)

(58) Field of Classification Search
CPC .......... B60L 58/18; B60L 58/64; B60L 58/12; B60L 58/20
See application file for complete search history.

(56) References Cited

U.S. PATENT DOCUMENTS 10,073,990 B1 * 9/2018 Shieh .................. G06F 1/26
10,870,411 B1 * 12/2020 Schafer ................ G07C 9/28
(Continued)

FOREIGN PATENT DOCUMENTS

JP   2011-96233 A   5/2011
JP   2012-75241 A   4/2012
(Continued)

OTHER PUBLICATIONS

International Search Report for PCT/KR2021/010834 (PCT/ISA/210) mailed on Nov. 23, 2021.
(Continued)

*Primary Examiner* — Michael Mccullough
*Assistant Examiner* — Kalyanavenkateshware Kumar
(74) *Attorney, Agent, or Firm* — Birch, Stewart, Kolasch & Birch, LLP

(57) ABSTRACT

A battery pack for a vehicle, which allows smooth communication and power connection to the vehicle when mounted to an electric vehicle. The battery pack includes a vehicle controller, an auxiliary battery and a vehicle memory to supply a driving power to the motor, and also includes a battery cell; a power supply terminal; a power supply path; a switch; a memory reader configured to read charging information stored in the vehicle memory; and a processor configured to control the switch to supply a power from the battery cell to the auxiliary battery, based on the charging information of the auxiliary battery read by the memory reader.

13 Claims, 8 Drawing Sheets

(52) U.S. Cl.
CPC .. *H01M 10/425* (2013.01); *H01M 2010/4271* (2013.01); *H01M 2010/4278* (2013.01); *H01M 2220/20* (2013.01)

(56) References Cited

U.S. PATENT DOCUMENTS

2013/0127247 A1* 5/2013 Oh .......................... B60L 58/20
                                                          307/10.1
2013/0127400 A1   5/2013 Oh et al.
2016/0336626 A1* 11/2016 Kawauchi ............. H02J 7/0032
2020/0317084 A1* 10/2020 Schaffer ................ B60L 53/305

FOREIGN PATENT DOCUMENTS

| KR | 10-2012-0012660 A | 2/2012 |
| KR | 10-2012-0083066 A | 7/2012 |
| KR | 10-2013-0056597 A | 5/2013 |
| KR | 10-2013-0130217 A | 12/2013 |
| KR | 10-1559086 B1 | 10/2015 |
| KR | 10-2015-0130671 A | 11/2015 |
| KR | 10-2018-0047896 A | 5/2018 |
| KR | 10-1878023 B1 | 7/2018 |
| KR | 10-1903271 B1 | 10/2018 |
| KR | 10-2019-0067992 A | 6/2019 |

OTHER PUBLICATIONS

Extended European Search Report for corresponding European Application No. 21856298.1, dated Jul. 7, 2023.

* cited by examiner

BATTERY PACK

TECHNICAL FIELD

The present application claims priority to Korean Patent Application No. 10-2020-0102648 filed on Aug. 14, 2020 in the Republic of Korea, the disclosures of which are incorporated herein by reference.

The present disclosure relates to a battery technology, and more specifically, to an exchange-type battery pack detachably attached to a vehicle configured to enable a vehicle to perform functions smoothly when the battery pack is mounted to the vehicle even though an auxiliary battery of the vehicle is discharged.

BACKGROUND ART

Currently commercialized secondary batteries include nickel cadmium battery, nickel hydrogen battery, nickel zinc battery, lithium secondary battery, and so on. Among these, the lithium secondary battery has almost no memory effect to ensure free charge and discharge, compared to the nickel-based secondary battery, and the lithium secondary battery is spotlighted due to a very low discharge rate and a high energy density.

The lithium secondary battery mainly uses a lithium-based oxides and a carbon material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed therebetween, and an exterior, or a battery case, for hermetically accommodating the electrode assembly together with an electrolyte.

Generally, the lithium secondary batteries may be classified into a can-type secondary battery having an electrode assembly included in a metal can and a pouch-type secondary battery having an electrode assembly included in a pouch of an aluminum laminate sheet, depending on the shape of the exterior.

The secondary batteries have been widely used to supply an operation power to portable terminals such as smart phones and laptop computers for several decades, and recently, as the development and distribution of electric vehicles expand, the secondary batteries are recognized as a very important part serving as a driving energy source that enables electric vehicles to move. In particular, since high output and capacity are required to drive an electric vehicle, the secondary battery is not used alone, but a large number of secondary batteries are connected in series and/or parallel to each other to constitute one high-voltage battery pack, and the battery pack is mounted to the electric vehicle.

The battery pack for supplying a driving power for moving the vehicle as described above may be configured to be attachable to and detachable from a vehicle. Further, as the shared e-mobility business is activated, the secondary battery may be configured to be easily mounted to and detached from a vehicle by not only professional technicians but also general drivers. For example, in order to use a shared vehicle, there may occur a situation that a user carries a battery pack and directly mount it after reaching the shared vehicle.

In such a situation, if the battery pack is mounted to the vehicle, it is necessary to properly supply a power between the vehicle and the battery pack. In particular, the vehicle is equipped with a control unit such as a VCU (Vehicle Control Unit), and when the battery pack is mounted, it is necessary to perform smooth communication between the control unit of the vehicle and the battery pack. In general, when a driver starts the vehicle, a power supply request signal may be transmitted from the vehicle control unit (VCU) to the battery pack, so that a driving power is supplied from the battery pack to a motor.

However, if communication between the control unit of the vehicle and the battery pack is not smoothly performed, a situation may occur in which the power supply request signal is not transmitted from the control unit of the vehicle to the battery pack even if the driver sends a request for starting. In addition, due to this, the vehicle may not start properly.

Moreover, the electric vehicle may be separately equipped with an auxiliary battery for supplying a power to electrical components of the vehicle, such as an instrument panel, a radio, a navigation system and an air conditioner, in addition to the battery pack for supplying a driving power. At this time, the control unit of the vehicle such as the VCU may also be operated by receiving a power from the auxiliary battery. However, if the auxiliary battery is fully discharged, an operation power is not supplied to the control unit of the vehicle, so the control unit of the vehicle cannot transmit a start request signal or the like to the battery pack. Therefore, even if the battery pack is fully charged, the vehicle may not be started since auxiliary battery of the vehicle is fully discharged.

Moreover, in the case of a shared vehicle, since the vehicle is not directly managed by a user, it is difficult to properly figure out in advance whether the auxiliary battery of the vehicle is in a discharged state. In addition, since the vehicle is not always located at a service provider due to the characteristics of the shared vehicle, it is difficult to manage whether the auxiliary battery provided in each vehicle is fully discharged one by one.

DISCLOSURE

Technical Problem

The present disclosure is designed to solve the problems of the related art, and therefore the present disclosure is directed to providing a battery pack for a vehicle, which is configured to allow smooth communication and power connection to the vehicle when the battery pack is mounted to an electric vehicle, and a vehicle including the battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, which includes a vehicle control unit, an auxiliary battery for supplying an operation power to the vehicle control unit and a vehicle memory for storing charging information of the auxiliary battery and is configured to be detachably attached to a vehicle driven by a motor to supply a driving power to the motor, the battery pack comprising: a battery cell having at least one secondary battery; a power supply terminal configured to be connectable to a connection terminal of the vehicle connected to the auxiliary battery and the motor; a power supply path located between the power supply terminal and the battery cell and configured to supply a power from the battery cell to the power supply terminal; a switching unit provided on the power supply path and configured to selectively turn on/off the power supply path; a memory reader unit configured to read charging information stored in the vehicle memory by using the power of the battery cell; and a processor configured to control the switching unit to supply a power from the battery cell to the auxiliary battery, based on the charging information of the auxiliary battery read by the memory reader unit.

Here, the processor may be configured to communicate with the vehicle control unit and be configured to operate the memory reader unit to read the charging information stored in the vehicle memory when a response signal is not received from the vehicle control unit after the battery pack is mounted to the vehicle.

In addition, the memory reader unit may be configured to read the charging information stored in the vehicle memory by allowing the driving current to flow in the vehicle memory.

In addition, the memory reader unit may be configured to supply an electromagnetic wave to the vehicle memory so that the driving current flows in the vehicle memory by electromagnetic induction and receive the charging information transmitted by the driving current.

In addition, the battery pack according to the present disclosure may further comprise a terminal communication unit configured to communicate with a portable terminal of a user.

In addition, the processor may be configured to turn on the switching unit after receiving a permission signal of the user through the terminal communication unit.

In addition, the processor may be configured to turn on the switching unit after a predetermined delay time since the permission signal of the user is received.

In addition, the processor may be configured to receive location information of the portable terminal from the terminal communication unit and control an operation of the memory reader unit based on the received location information.

In addition, battery pack according to the present disclosure may further comprise a location recognition unit configured to recognize a location of the battery pack, and the processor may be configured to control an operation of the memory reader unit based on the location information recognized by the location recognition unit.

In addition, the processor may be configured to control at least one of a charging time, a charging amount, a charging voltage and a charging current of the auxiliary battery based on the charging information read by the memory reader unit.

In another aspect of the present disclosure, there is also provided a vehicle, comprising the battery pack according to the present disclosure.

Advantageous Effects

According to an embodiment of the present disclosure, with respect to a battery pack configured to be detachably attached to a vehicle, it is possible to easily determine whether the auxiliary battery of the vehicle is discharged by the battery pack itself.

Therefore, when it is determined that the auxiliary battery of the vehicle is discharged, power may be supplied from the battery pack to charge the auxiliary battery. Accordingly, the battery pack may smoothly communicate with the vehicle control unit or the like that supplies power from the auxiliary battery, and thus the operation of the vehicle may not be affected at all.

Moreover, this aspect of the present disclosure may be more effectively applied to a shared e-mobility business and the like. That is, in the case of a driver using a shared vehicle service or a service provider providing such a service, even if it is not checked whether the auxiliary battery is discharged, the vehicle may start normally since the battery pack itself detects whether the auxiliary battery is discharged and charges the auxiliary battery.

Accordingly, a driver using the shared vehicle service may use the service smoothly, and the maintenance cost of a service provider that provides the service may be reduced. In particular, according to the embodiment, even if the auxiliary battery of the vehicle is fully discharged, there is no need for a professional manager or technician of the corresponding service provider to directly move to the vehicle.

In addition, effects of various embodiments according to the present disclosure may be achieved, which will be described later in each embodiment.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
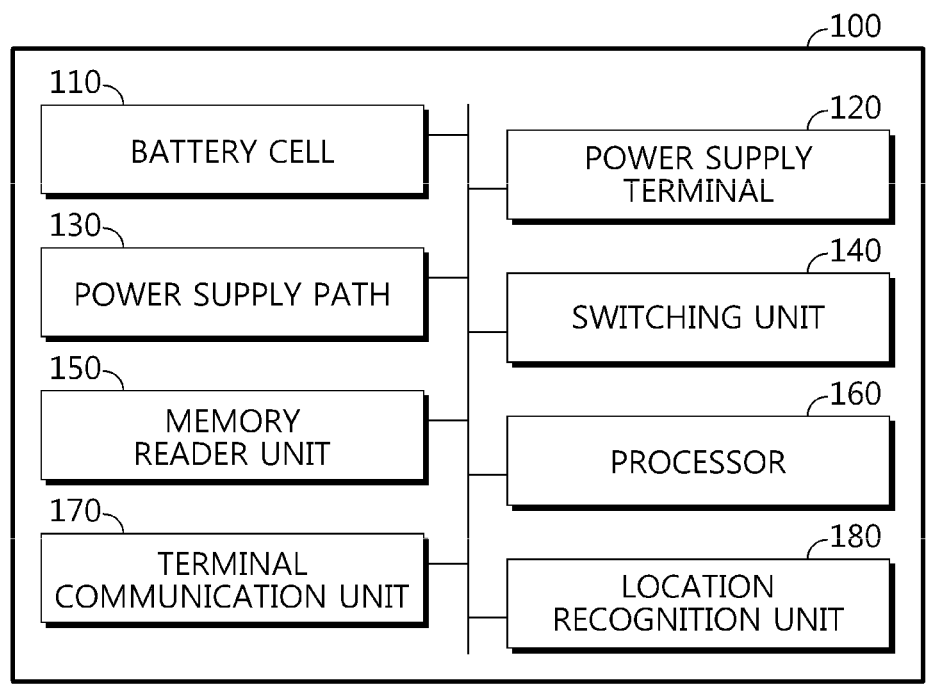
FIG. 1 is a block diagram schematically showing a functional configuration of a battery pack according to an embodiment of the present disclosure.
Figure 2:
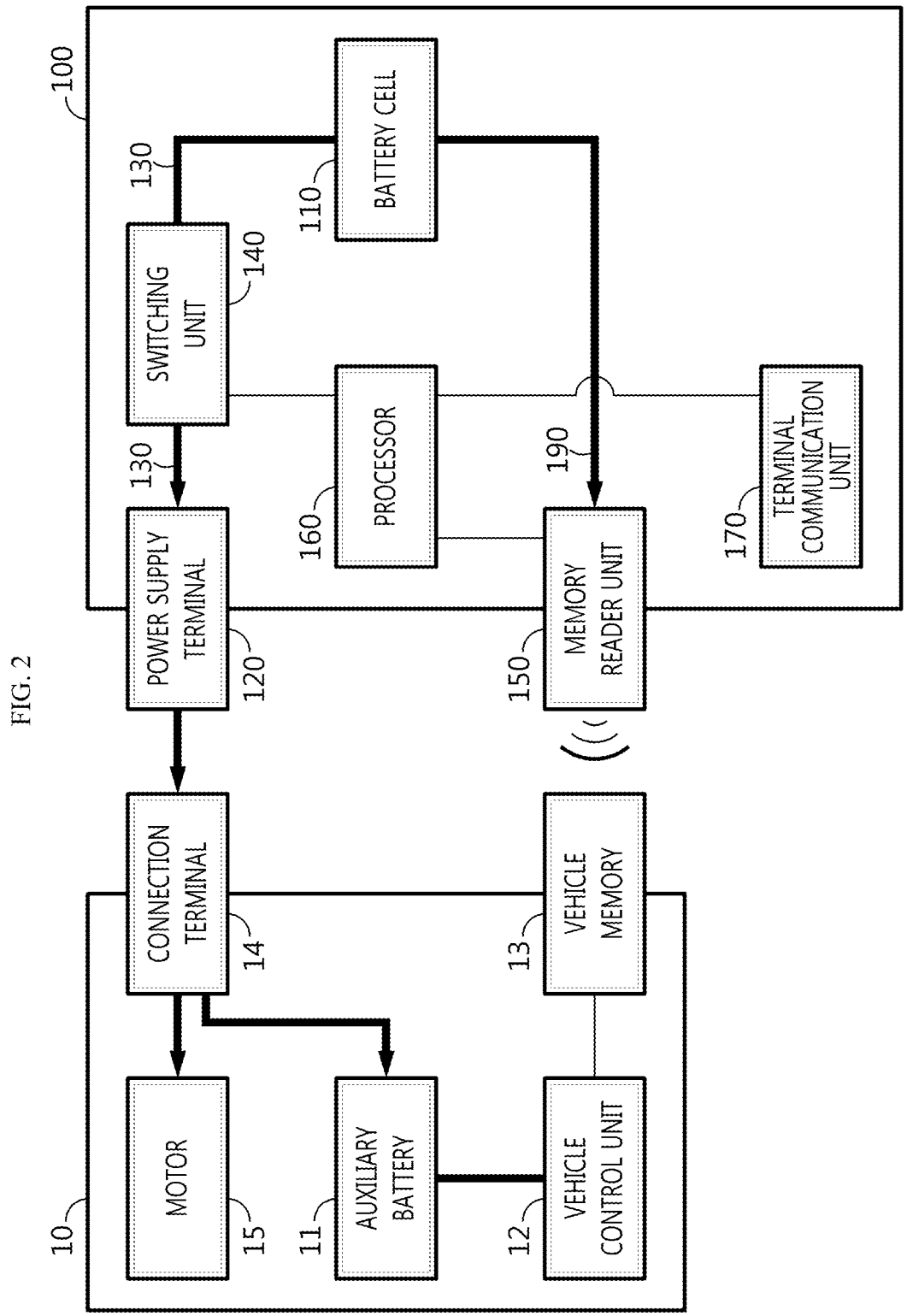
FIG. 2 is a diagram schematically showing a connection configuration of the battery pack according to an embodiment of the present disclosure and a vehicle.

FIG. 1 is a block diagram schematically showing a functional configuration of a battery pack 100 according to an embodiment of the present disclosure, and FIG. 2 is a diagram schematically showing a connection configuration between a battery pack 100 and a vehicle 10 according to an embodiment of the present disclosure.

The battery pack 100 according to the present disclosure may be configured to be attachable to and detachable from the vehicle 10. That is, the battery pack 100 according to the present disclosure may be mounted to the vehicle 10 or may be separated from the vehicle 10. Further, the battery pack 100 according to the present disclosure may be configured in the form of an interchangeable battery pack 100 that may be freely mounted to or detached from the same type of vehicle 10 or different types of vehicles 10. To this end, the battery pack 100 according to the present disclosure may be configured to be mechanically coupled to a portion of the vehicle 10 in order to maintain the electrically coupled state as well as to be electrically coupled to the vehicle 10. However, the present disclosure is not specifically limited in regard to the mechanical and/or electrical coupling form of the battery pack 100 and the vehicle 10, and various electrical and/or mechanical coupling form known at the time of filing of this application may be employed in the present disclosure.

Meanwhile, the vehicle 10 to which the battery pack 100 according to the present disclosure is mounted may be a vehicle that includes a motor 15 and is driven by the motor 15, namely an electric vehicle moving by the motor 15. Here, the electric vehicle may include not only a pure electric vehicle but also a hybrid electric vehicle having an engine together with the motor 15, a two-wheeled vehicle, and the like.

In addition, the vehicle 10 to which the battery pack 100 according to the present disclosure is mounted may include a vehicle control unit 12. Here, the vehicle control unit 12 may be expressed in terms such as VCU, and may mean a control device provided in the vehicle 10 to control the driving or the like of the vehicle 10. Since the vehicle control unit 12 is a technology already known at the time of filing of this application, it will not described in detail here.

In addition, the vehicle 10 to which the battery pack 100 according to the present disclosure is mounted may include an auxiliary battery 11. That is, the battery pack 100 according to the present disclosure may be configured to be mounted to the vehicle 10 including the auxiliary battery 11. Here, the auxiliary battery 11 may be configured to supply an operation power to the vehicle control unit 12. In addition, the auxiliary battery 11 may be configured to supply a power to other electrical equipment mounted in the vehicle 10 in addition to the vehicle control unit 12.

In addition, the vehicle 10 to which the battery pack 100 according to the present disclosure is mounted may include a vehicle memory 13. Here, the vehicle memory 13 may be configured to store charging information of the auxiliary battery 11. The information storage configuration of the auxiliary battery 11 will be described later in more detail.

The battery pack 100 according to the present disclosure may be configured to be detachably attached to the vehicle 10 and supply a power to the vehicle 10 when being mounted to the vehicle 10. In particular, the battery pack 100 according to the present disclosure may be configured to supply a power to the motor 15 of the vehicle 10.

As shown in FIGS. 1 and 2, the battery pack 100 according to the present disclosure may include a battery cell 110, a power supply terminal 120, a power supply path 130, a switching unit 140, a memory reader unit 150, and a processor 160.

The battery cell 110 may include at least one secondary battery. In addition, the secondary battery may include an electrode assembly, an electrolyte and an exterior. Here, the electrode assembly is an assembly of an electrode and a separator and may be configured in a form where at least one positive electrode plate and at least one negative electrode are disposed with a separator being interposed therebetween. In addition, each electrode plate of the electrode assembly may have an electrode tab to be connected to an electrode lead. The secondary battery may include a pouch-type secondary battery in which an exterior is configured in the form of an aluminum pouch sheet and/or a can-type secondary battery in which an exterior is configured in the form of a metal can. Further, since the battery pack 100 according to the present disclosure is mounted to the vehicle 10 and requires high output and/or high capacity to supply a driving power to the vehicle 10, the battery pack 100 may include a battery cell 110 in which a plurality of secondary batteries are connected in series and/or parallel. In addition, the battery cell 110 may store and discharge energy for driving through repeated charging and discharging. The present disclosure is not limited by a specific shape or configuration of the battery cell 110, particularly the secondary battery, and various types of secondary batteries or battery cells 110 known at the time of filing of this application may be employed in the present disclosure.

The power supply terminal 120 may be configured to be connectable to a connection terminal 14 provided to the vehicle 10. Here, the connection terminal 14 of the vehicle 10 is a terminal provided on at least one side of the vehicle 10 to be connected to the battery pack 100, and may be configured in the form of an outlet or a plug. In particular, the connection terminal 14 of the vehicle 10 may be configured to be electrically connected to the motor 15 and the auxiliary battery 11. For example, in the vehicle 10, the connection terminal 14 may be configured to be connected to the motor 15 and the auxiliary battery 11, respectively. Accordingly, the power supplied to the connection terminal 14 of the vehicle 10 may be supplied to the motor 15 and/or the auxiliary battery 11. The power supply terminal 120 is a terminal of the battery pack 100 configured to be connectable to the connection terminal 14 of the vehicle 10, and may be configured in a form corresponding to the connection terminal 14 of the vehicle 10, for example in the form of an outlet or a plug.

The power supply path 130 may be disposed to be located between the power supply terminal 120 and the battery cell 110. In addition, the power supply path 130 may be configured to supply a power from the battery cell 110 to the power supply terminal 120. That is, the power supply path 130 may provide a path through which a power is supplied from the battery cell 110 to the power supply terminal 120. The power supply path 130 may employ various power supply types known at the time of filing of this application, such as a wire or a metal plate including an electrically conductive material, a printed conductor pattern, and the like.

The switching unit 140 may be provided on the power supply path 130. In addition, the switching unit 140 may be configured to be opened and closed to electrically turn on/off the power supply path 130. For example, if the switching unit 140 is turned on, the power supply path 130 may be connected so that a power may be supplied from the battery cell 110 to the power supply terminal 120. Meanwhile, if the switching unit 140 is turned off, the power supply path 130 may be disconnected so that a power may not be supplied from the battery cell 110 to the power supply terminal 120. As the switching unit 140, various types of switching devices known at the time of filing of this application may be employed. For example, the switching unit 140 may be implemented with a metal oxide semiconductor field effect transistor (MOSFET) or the like.

The memory reader unit 150 may be configured to read charging information stored in the vehicle memory 13. Here, the charging information stored in the vehicle memory 13 may be information about a SOC (State Of Charge) of the auxiliary battery 11 provided in the vehicle 10. For example, the vehicle memory 13 may store information indicating that the SOC of the auxiliary battery 11 is less than or equal to a reference value as the charging information. In particular, when the SOC of the auxiliary battery 11 is lowered not to operate the vehicle control unit 12, the vehicle memory 13 may store such discharge state information as the charging information.

In this case, the charging information of the vehicle memory 13 may be configured to be stored by the vehicle control unit 12. That is, the vehicle control unit 12 may monitor the SOC of the auxiliary battery 11 or receive information about the SOC from the auxiliary battery 11. In addition, when the SOC of the auxiliary battery 11 is below a certain level, the vehicle control unit 12 may store the charging information of the auxiliary battery 11 in the vehicle memory 13 in a state where the vehicle 10 is in a turning-on state or a start key of the vehicle 10 is turned on. For example, the vehicle control unit 12 may be configured to store the SOC of the auxiliary battery 11 in the vehicle memory 13 when the vehicle 10 turns off or the start key of the vehicle 10 is turned off.

In particular, the memory reader unit 150 may be configured to use the power of the battery cell 110 in order to read the charging information stored in the vehicle memory 13. For example, as shown in FIG. 2, the battery pack 100 may include a reader power path 190 configured to supply a power from the battery cell 110 to the memory reader unit 150. In addition, the memory reader unit 150 may receive the power from the battery cell 110 through the reader power path 190 and read the charging information stored in the vehicle memory 13 using the supplied power. That is, even if the vehicle memory 13 of the vehicle 10 cannot actively transmit the charging information, the memory reader unit 150 of the battery pack 100 may read the charging information stored in the vehicle memory 13 by using the power of the battery cell 110.

In particular, when the exchange-type battery pack 100 is mounted to the vehicle 10, the battery cell 110 is generally fully charged in many cases. Therefore, the memory reader unit 150 has no difficulty in using the charging power of the battery cell 110 as an operating power of the memory reader unit 150. In addition, according to this embodiment of the present disclosure, since there is no need to provide a separate power supply for the operation of the memory reader unit 150, the structure of the battery pack 100 may be more simplified.

In addition, the memory reader unit 150 may read the charging information stored in the vehicle memory 13 in a wireless communication method. In this case, the memory reader unit 150 and the vehicle memory 13 do not need have a connector, a cable, a terminal, or the like for mutual wired connection.

The processor 160 may be configured to control the switching unit 140 so that a power is supplied from the battery cell 110 to the auxiliary battery 11. In particular, in controlling the switching unit 140, the processor 160 may be configured to use the charging information of the auxiliary battery 11 read by the memory reader unit 150. That is, the processor 160 may turn on the switching unit 140 based on the charging information of the auxiliary battery 11 read by the memory reader unit 150 so that a power is supplied from the battery cell 110 to the auxiliary battery 11. In addition, by supplying the power as above, the auxiliary battery 11 of the vehicle 10 may be charged, and the vehicle control unit 12 may operate normally as the auxiliary battery 11 is charged.

According to this configuration of the present disclosure, the battery pack 100, for example, an exchange-type battery pack, configured to be detachably attached to the vehicle 10 may easily determine by itself whether the auxiliary battery 11 is discharged. In particular, even in a situation where the auxiliary battery 11 of vehicle 10 is discharged so that a separate power is not supplied to the vehicle control unit 12 and the vehicle memory 13, the battery pack 100 may determine by itself whether the auxiliary battery 11 of the vehicle 10 is fully discharged. Therefore, when the auxiliary battery 11 is fully discharged, a charging power is supplied to the auxiliary battery 11 from the battery pack 100, so that the vehicle control unit 12 and the like may operate normally.

Moreover, according to this embodiment, the auxiliary battery 11 may be automatically charged without a special action or command by a separate administrator or user (vehicle driver). Therefore, it is easy for a service provider to manage shared vehicles of which the auxiliary batteries 11 are relatively easily discharged, and it is possible to prevent an unexpected operation unavailable situation for the user. In particular, even if the battery cell 110 of the battery pack 100 has a sufficient charging power, the vehicle control unit 12 may not operate normally if the auxiliary battery 11 of the vehicle 10 is discharged. Therefore, according to the prior art, in a situation where the auxiliary battery is discharged, communication is not made between the vehicle control unit and the battery pack even when the user turns on the start key, so that a driving power is not supplied from the battery pack to the vehicle, which may cause a problem that the vehicle does not start. However, according to the configuration of the present disclosure, in a situation where the vehicle control unit 12 does not operate because the auxiliary battery 11 is discharged, the battery pack 100 may detect by itself whether the auxiliary battery 11 is discharged and automatically charge the auxiliary battery 11 when the auxiliary battery 11 is fully discharged, and thus the vehicle control unit 12 may be immediately converted into a state that can communicate with the battery pack 100.

Meanwhile, the processor 160 is well known in the art for executing various control logics performed in the present disclosure, and may optionally include or be expressed in terms of a central processing unit (CPU), an application-specific integrated circuit (ASIC), a chipset, a logic circuit, a register, a communication modem, a data processing device and the like. Also, when the control logic is implemented in software, the processor 160 may be implemented as a set of program modules. In this case, the program module may be stored in a memory and executed by the processor 160. The memory may be provided inside or outside the processor 160, and may be connected to the processor 160 by various well-known means. Moreover, the battery pack 100 often includes a control device referred to by terms such as MCU (Micro Controller Unit) or BMS (Battery Management System). The processor 160 may be implemented by components such as MCU or BMS generally included in the battery pack 100.

In addition, the processor 160 may be configured to communicate with the vehicle control unit 12. For example, the processor 160 may be connected with the vehicle control unit 12 through wired communication and/or wireless communication to transmit/receive signals to and from the vehicle control unit 12. In addition, for communication with the vehicle control unit 12, the processor 160 may include a connector or cable for wired communication and/or an antenna for wireless communication. In addition, as a communication method between the processor 160 and the vehicle control unit 12, various communication technologies known at the time of filing of this application may be employed as a matter of course.

Here, the processor 160 may be configured to receive a response signal from the vehicle control unit 12 after the battery pack 100 is mounted to the vehicle 10. In addition, the processor 160 may be configured to control the operation of the memory reader unit 150 according to whether the response signal is received. This will be described in more detail with reference to FIG. 3.

Figure 3:
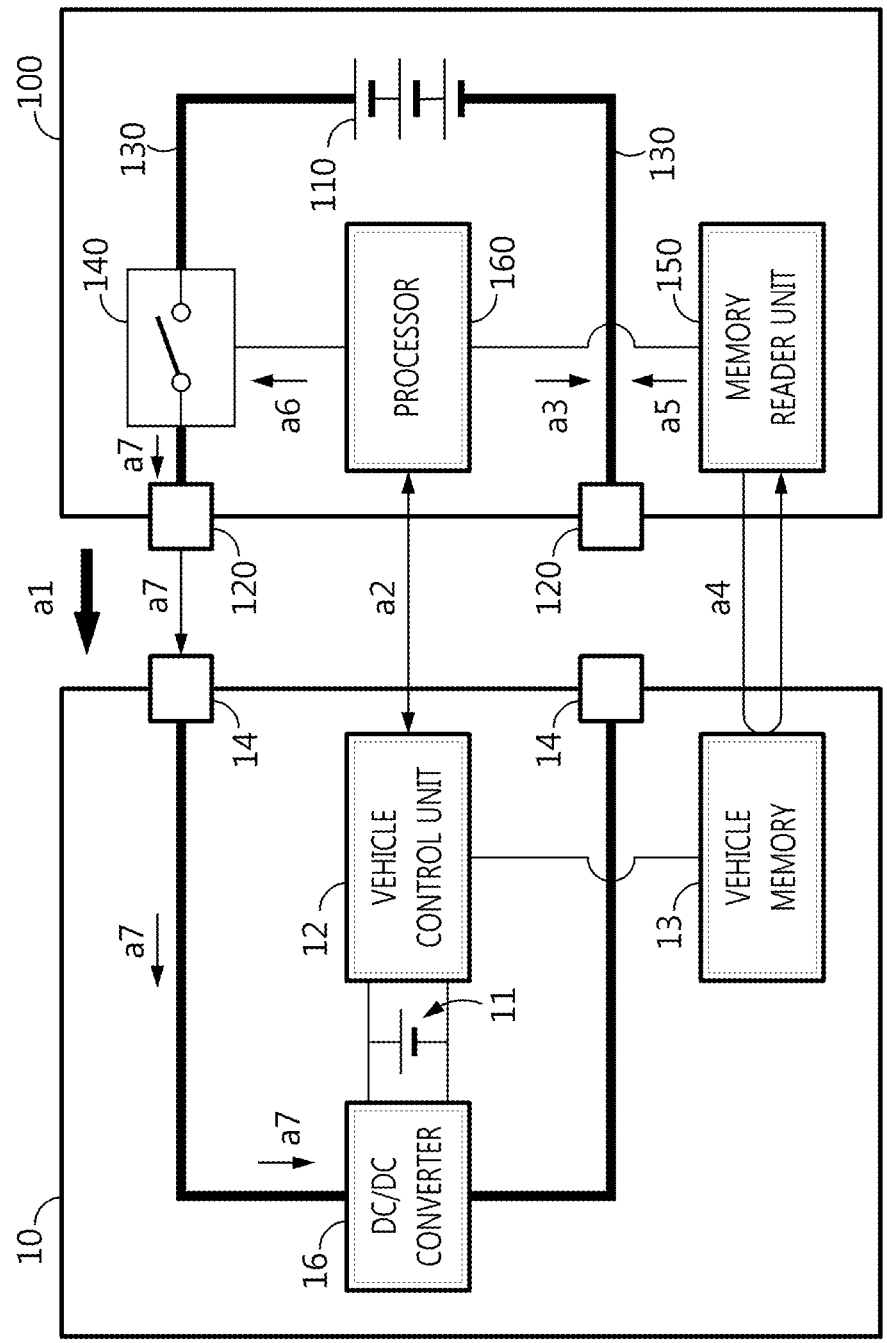
FIG. 3 is a diagram schematically showing the connection configuration between the battery pack according to an embodiment of the present disclosure and a vehicle.

FIG. 3 is a diagram schematically showing the connection configuration between the battery pack 100 according to an embodiment of the present disclosure and the vehicle 10.

Referring to FIG. 3, as indicated by an arrow a1, when the battery pack 100 is mounted to the vehicle 10, for example a power train of the vehicle 10, the processor 160 and the vehicle control unit 12 are configured to communicate with each other, as indicated by an arrow a2. For example, the processor 160 may be configured to transmit a response request signal to the vehicle control unit 12 in a state where the battery pack 100 is mounted to the vehicle 10, and the vehicle control unit 12 may be configured to transmit a response signal corresponding to the response request signal to the processor 160.

Here, if the processor 160 transmits a response request signal to the vehicle control unit 12 and normally receives a response signal from the vehicle control unit 12, the processor 160 may allow the memory reader unit 150 not to operate. However, if the processor 160 does not receive a response signal from the vehicle control unit 12 despite transmitting the response request signal to the vehicle control unit 12, the processor 160 may be configured to transmit a control signal as indicated by an arrow a3 to operate the memory reader unit 150. In addition, by the operation of the memory reader unit 150, as indicated by an arrow a4, the charging information stored in the vehicle memory 13 may be read. In addition, the charging information read at this time may be transmitted from the memory reader unit 150 to the processor 160, as indicated by an arrow a5. In this case, if the information transmitted to the processor 160 is information that the auxiliary battery 11 is discharged, the processor 160 may transmit a control signal to turn on the switching unit 140 as indicated by an arrow a6. In addition, by turning on the switching unit 140, a charging power may be supplied from the battery cell 110 of the battery pack 100 to the auxiliary battery 11 of the vehicle 10, as indicated by an arrow a7. At this time, a DC/DC converter 16 may be provided at an input terminal of the auxiliary battery 11 of the vehicle 10, so that a power of an appropriate magnitude may be supplied to the auxiliary battery 11.

According to this configuration of the present disclosure, the memory reader unit 150 may not be always operated, but may be operated only when a response signal is not received from the vehicle control unit 12. That is, if a response signal is received from the vehicle control unit 12 in a state where the battery pack 100 is mounted, the processor 160 may allow the memory reader unit 150 not to operate. At this time, since the vehicle control unit 12 operates normally, it may be regarded that the SOC of the auxiliary battery 11 is sufficient, and thus there is no need to operate the memory reader unit 150. Meanwhile, if a response signal is not received from the vehicle control unit 12 even though the battery pack 100 is mounted to the vehicle 10, it may be regarded that a driving power is not properly supplied from the auxiliary battery 11 to the vehicle control unit 12. Therefore, by operating the memory reader unit 150 as in this embodiment, it is possible to reliably check whether the auxiliary battery 11 is in a discharged state.

Therefore, according to this embodiment, the discharge state of the auxiliary battery 11 may be more accurately figured out, and power or resources may be prevented from being unnecessarily consumed by the memory reader unit 150. In particular, the memory reader unit 150 may be necessary to consume the power of the battery cell 110 in order to read the information stored in the vehicle memory 13. Therefore, the memory reader unit 150 inevitably consumes power during operation, but according to this embodiment, it is possible to prevent or reduce the unnecessary power consumption by the memory reader unit 150.

The memory reader unit 150 may be configured to allow a driving current to flow to the vehicle memory 13, in order to read the charging information stored in the vehicle memory 13. That is, the vehicle memory 13 may be configured such that a driving current flows therethrough by using the power supplied from the memory reader unit 150 of the battery pack 100 even if there is no power supplied from the vehicle 10. In addition, the vehicle memory 13 may be configured such that the stored information is transmitted to the memory reader unit 150 by using the driving current flowing in this way.

In particular, the memory reader unit 150 may be configured to allow a driving current to flow to the vehicle memory 13 when a separate power is not supplied from the auxiliary battery 11 of the vehicle 10 to the vehicle memory 13. Moreover, since the memory reader unit 150 may receive a sufficient power from the battery cell 110, it may be easily implemented to allow the driving current to flow to the vehicle memory 13. Therefore, even when auxiliary battery 11 of vehicle 10 is fully discharged, a driving current may flow in vehicle memory 13 by the memory reader unit 150, and thus the vehicle memory 13 may transmit the stored information to the memory reader unit 150. In addition, the memory reader unit 150 may read the charging information stored in the vehicle memory 13 through the information transmitted in this way.

The memory reader unit 150 may be configured to supply an electromagnetic wave to the vehicle memory 13 so that a driving current flows in the vehicle memory 13 by electromagnetic induction. In addition, the memory reader unit 150 may be configured to receive the charging information transmitted from the vehicle memory 13 by the driving current. That is, the memory reader unit 150 may allow a driving current to flow to the vehicle memory 13 by using electromagnetic induction phenomenon.

More specifically, the memory reader unit 150 may be configured to generate a radio signal, namely an electromagnetic wave, and transmit it to the vehicle memory 13. In addition, the memory reader unit 150 may be configured to receive the charging information of the auxiliary battery 11 transmitted from the vehicle memory 13. To this end, the memory reader unit 150 may be regarded as including a transmitter for supplying an electromagnetic wave to the vehicle memory 13 and a receiver for receiving the electromagnetic wave transmitted from the vehicle memory 13. For example, the memory reader unit 150 may be configured to include an antenna in the form of a coil to generate an electromagnetic wave to the vehicle memory 13 and to receive an electromagnetic wave transmitted from the vehicle memory 13.

Meanwhile, the vehicle memory 13 may include an antenna and an IC chip (Integrated Circuit chip) so that a driving current may flow through the electromagnetic wave supplied from the memory reader unit 150 and the information stored therein may be supplied to the memory reader unit 150 by the driving current. Here, the antenna may be implemented in a form in which a current flows through the electromagnetic wave supplied from the memory reader unit 150. In particular, the antenna may be configured in the form of a coil to allow a current to flow by means of the change in magnetic flux supplied from the memory reader unit 150. In addition, the IC chip may be configured to store various kinds of information, particularly the charging information of the auxiliary battery 11. In this case, the charging information of the auxiliary battery 11 may be stored by the vehicle control unit 12. Moreover, if the SOC of the auxiliary battery 11 is equal to or less than a reference value, the vehicle control unit 12 may be configured to store the corresponding information in the IC chip. In addition, if a current flows through the antenna, the IC chip may be configured to transmit the information stored therein as a wireless signal through the antenna to the outside, particularly the memory reader unit 150.

The communication method between the memory reader unit 150 and the vehicle memory 13 may be implemented in a short-range wireless communication type such as a RFID (Radio Frequency IDentification) or NFC (Near Field Communication). For example, the memory reader unit 150 may be configured in the form of an RFID reader, and the vehicle memory 13 may be configured in the form of an RFID tag.

In particular, the communication method between the memory reader unit 150 and the vehicle memory 13 may be implemented as a passive RFID method. In the passive RFID method, it is not necessary to separately supply a power to the vehicle memory 13. Therefore, even if the auxiliary battery 11 of the vehicle 10 is in a discharged state, if the memory reader unit 150 is located only within the communication range with the vehicle memory 13, the information stored in the vehicle memory 13 may be read by using the power of the battery pack 100. In addition, through this process, the memory reader unit 150 may figure out the fact that the auxiliary battery 11 of the vehicle 10 is discharged.

However, the present disclosure is not necessarily limited to this specific communication form, and the communication method between the memory reader unit 150 and the vehicle memory 13 may be implemented in various types of wireless communication methods known at the time of filing of this application.

Meanwhile, the subject that stores the charging information for the vehicle memory 13 may be the vehicle control unit 12. For example, the vehicle control unit 12 may be configured to store information indicating that the power of the auxiliary battery 11 is insufficient in the vehicle memory 13, if the SOC (State Of Charge) of the auxiliary battery 11 is equal to or less than a certain level. In particular, if the SOC of the auxiliary battery 11 is lowered not to operate the vehicle control unit 12, the vehicle control unit 12 may be configured to store the fact in the vehicle memory 13.

In addition, the battery pack 100 according to the present disclosure may further include a terminal communication unit 170 as shown in FIGS. 1 and 2.

The terminal communication unit 170 may be configured to communicate with a portable terminal of a user. In particular, the terminal communication unit 170 may be configured to exchange signals with the portable terminal of the user in a wireless manner such as Bluetooth, WiFi, or NFC. To this end, the terminal communication unit 170 may include an antenna for communicating with the portable terminal of the user. Meanwhile, an application configured to communicate with the terminal communication unit 170 of the battery pack 100 may be loaded in the portable terminal of the user.

The terminal communication unit 170 may be configured to be electrically connected to the processor 160 to send and receive signals. That is, the processor 160 may be configured to transmit/receive signals with an external device through the terminal communication unit 170. For example, the processor 160 may be connected to a smartphone of a user (vehicle driver) through the terminal communication unit 170 to receive a command signal from the user or transmit a notification signal to the user.

In particular, the processor 160 may be configured to receive a permission signal of the user through the terminal communication unit 170. In addition, the processor 160 may be configured to turn on the switching unit 140 after receiving the permission signal of the user. That is, the processor 160 may be configured not to turn on the switching unit 140 before receiving the permission signal of the user. This will be described in more detail with reference to FIG. 4.

Figure 4:
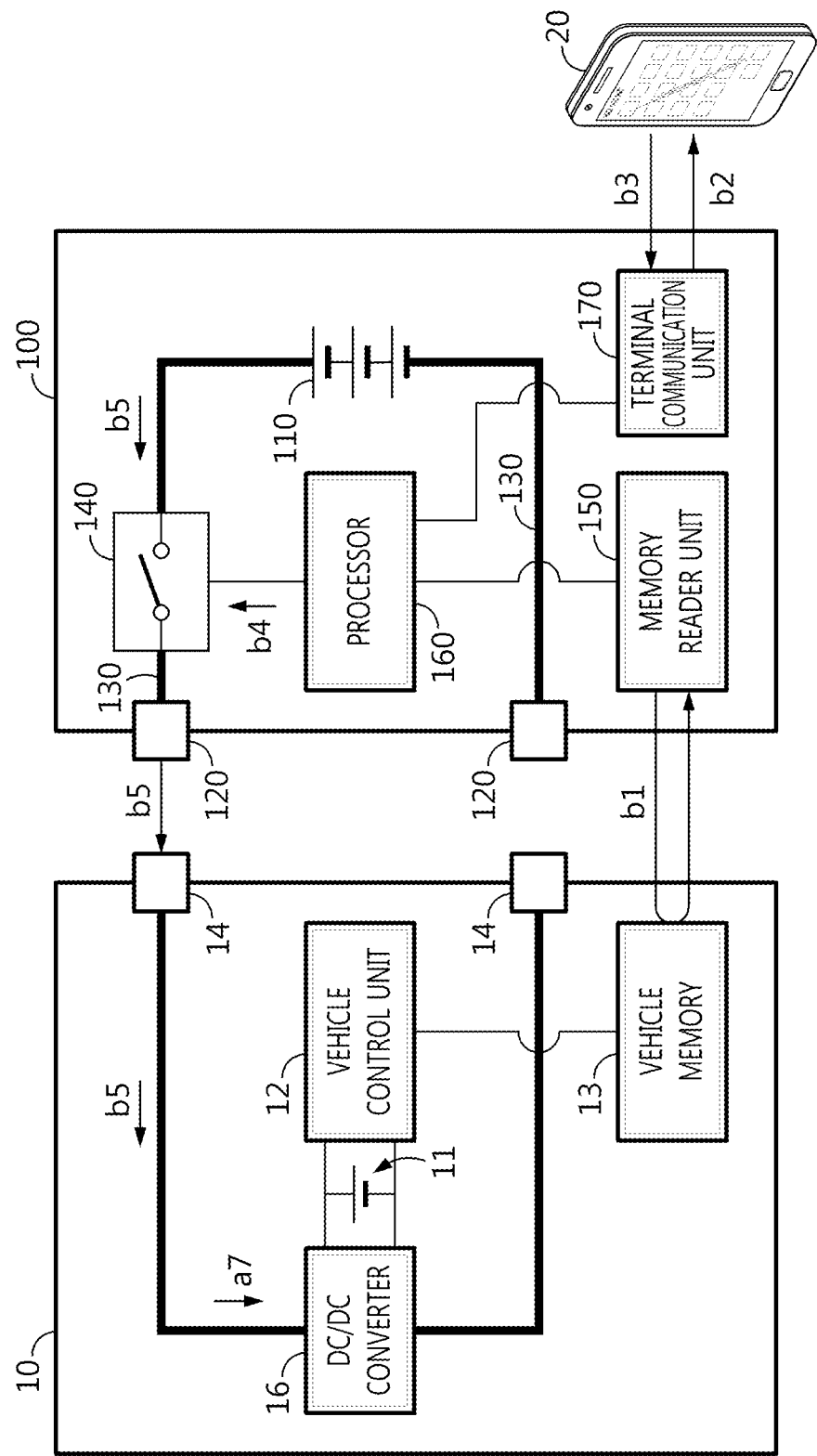
FIG. 4 is a diagram schematically showing a battery pack according to another embodiment of the present disclosure, which is connected to a vehicle and a portable terminal.

FIG. 4 is a diagram schematically showing a battery pack 100 according to another embodiment of the present disclosure, which is connected to a vehicle 10 and a portable terminal 20. In this embodiment, features different from the former embodiment will be described in detail, and features identical or similar to those of the former embodiment will not be described in detail.

Referring to FIG. 4, if the memory reader unit 150 receives the information that the auxiliary battery 11 is fully discharged from the vehicle memory 13 as indicated by an arrow b1, this information may be transmitted to the processor 160. In this case, the processor 160 may be configured to communicate with the portable terminal 20 through the terminal communication unit 170. Here, the portable terminal 20 may be a portable terminal 20 of a vehicle driver, for example a smartphone. In particular, as indicated by an arrow b2, the processor 160 may transmit the fact that the auxiliary battery 11 is fully discharged to the portable terminal 20 and transmit a signal inquiring whether or not to charge the auxiliary battery 11. In this case, the driver may transmit a permission signal to the terminal communication unit 170 through the portable terminal 20, indicating that the auxiliary battery 11 may be charged, as indicated by an arrow b3. Then, this permission signal is transmitted to the processor 160, and the processor 160 may control the switching unit 140 to turn on the switching unit 140 as indicated by an arrow b4. In addition, if the switching unit 140 is turned on, as indicated by an arrow b5, a charging power may be supplied from the battery cell 110 to the auxiliary battery 11 of the vehicle 10.

In this embodiment, if the auxiliary battery 11 of the vehicle 10 is in a discharged state, the processor 160 may notify the driver that the auxiliary battery 11 is discharged before turning on the switching unit 140, and asks whether to turn on the switching unit 140 or not. In addition, the processor 160 may be configured to turn on the switching unit 140 after the user transmits the permission signal to turn on the switching unit 140 through the portable terminal 20.

According to this configuration of the present disclosure, since the confirmation of the user is required before the charging power is supplied from the battery pack 100 to the auxiliary battery 11 of the vehicle 10, the user may control the charging of the auxiliary battery 11 while recognizing the fact that the auxiliary battery 11 is discharged. Moreover, according to this configuration, since the power of the battery cell 110 is supplied to the power supply terminal 120 after the permission signal of the user is received, an electric shock accident of the user through the power supply terminal 120 may be prevented. In particular, when an exchange-type battery pack 100 is mounted to a shared vehicle 10, a situation where a user directly transports or handles the exchange-type battery pack 100 may occur frequently. However, according to this embodiment, it is possible to prevent an electric shock accident from occurring as the user touches the power supply terminal 120 while transporting or handling the exchange-type battery pack 100.

In addition, the processor 160 may be configured to receive a command on whether or not to operate the memory reader unit 150 from the portable terminal 20 through the terminal communication unit 170. That is, the processor 160 may inquire the portable terminal 20 of the driver through the terminal communication unit 170 about whether or not to operate the memory reader unit 150. At this time, if the driver transmits a signal permitting the operation of the memory reader unit 150 through the portable terminal 20, the permission signal may be transmitted to the processor 160 through the terminal communication unit 170. Then, the processor 160 may be configured to operate the memory reader unit 150 to read information of the vehicle memory 13.

According to this embodiment of the present disclosure, it is possible to prevent unnecessary operation of the memory reader unit 150. In particular, since the memory reader unit 150 may use the power of the battery cell 110 to perform the operation, if the unnecessary operation of the memory reader unit 150 is prevented, energy consumption of the battery cell 110 may be prevented.

In addition, the processor 160 may be configured to receive information on whether the battery pack 100 is mounted from the portable terminal 20 through the terminal communication unit 170. For example, the processor 160 may transmit a signal inquiring whether the battery pack 100 is mounted to the vehicle 10 to the portable terminal 20 of the driver through the terminal communication unit 170. In addition, if the driver transmits the fact that the battery pack 100 is mounted through the portable terminal 20, the processor 160 receiving this fact may be configured to operate the memory reader unit 150 or control the switching unit 140.

According to this configuration of the present disclosure, by allowing the memory reader unit 150 to operate or the switching unit 140 to be turned on in a state where the battery pack 100 is mounted, unnecessary resource consumption of the battery pack 100 may be prevented and an electric shock accident of the driver may be prevented.

In addition, the processor 160 may be configured to turn on the switching unit 140 after a predetermined delay time passes since the permission signal of the user is received through the terminal communication unit 170.

For example, in the configuration of FIG. 4, if the permission signal of the user is transmitted from the portable terminal 20 as indicated by the arrow b3, the processor 160 receiving the permission signal through the terminal communication unit 170 may turn on the switching unit 140 after a certain period of time passes, without directly turning on the switching unit 140. As a more specific example, at a time point after 30 seconds pass since the user transmits the permission signal indicating that the auxiliary battery 11 may be charged through the portable terminal 20, the processor 160 may turn on the switching unit 140 so that the charging power is supplied to the auxiliary battery 11 from the battery cell 110.

According to this configuration of the present disclosure, since a predetermined amount of time may be afforded before the charging power is supplied to the power supply terminal 120 of the battery pack 100, the user may be aware that a power will be supplied to the power supply terminal 120 of the battery pack 100 in advance and prepare appropriately. In particular, when the user directly transports or handles the exchange-type battery pack 100 of the shared vehicle 10, communication may be made between the battery pack 100 and the portable terminal 20 of the user in a state where the battery pack 100 is not mounted to the vehicle 10. Moreover, for smooth communication between the battery pack 100 and the portable terminal 20, communication with the portable terminal 20 may be required before the battery pack 100 is mounted to the vehicle 10. In this case, as in this embodiment, after the user transmits a permission signal through the portable terminal 20 so that the charging power may be supplied from the battery pack 100 to the auxiliary battery 11 of the vehicle 10, the power supply terminal 120 of the battery pack 100 is not activated for a predetermined time. Therefore, for the predetermined time, the user may safely mount the battery pack 100 to the vehicle 10 or handle the battery pack 100. In addition, by preventing the power supply terminal 120 of the battery pack 100 from being activated before the battery pack 100 is mounted to the vehicle 10, it is possible to prevent sparks from occurring at the terminal when the battery pack 100 is mounted to the vehicle 10.

In addition, the processor 160 may be configured to receive location information of the portable terminal 20 from the terminal communication unit 170. Here, the location information of the portable terminal 20 may be information indicating a relative location with the vehicle 10. For example, the location information of the portable terminal 20 may be information indicating how far the vehicle 10 and the portable terminal 20 are spaced apart from each other. In addition, the processor 160 may be configured to control the operation of the memory reader unit 150 based on the location information of the portable terminal 20 received in this way. This will be described in more detail with reference to FIG. 5.

Figure 5:
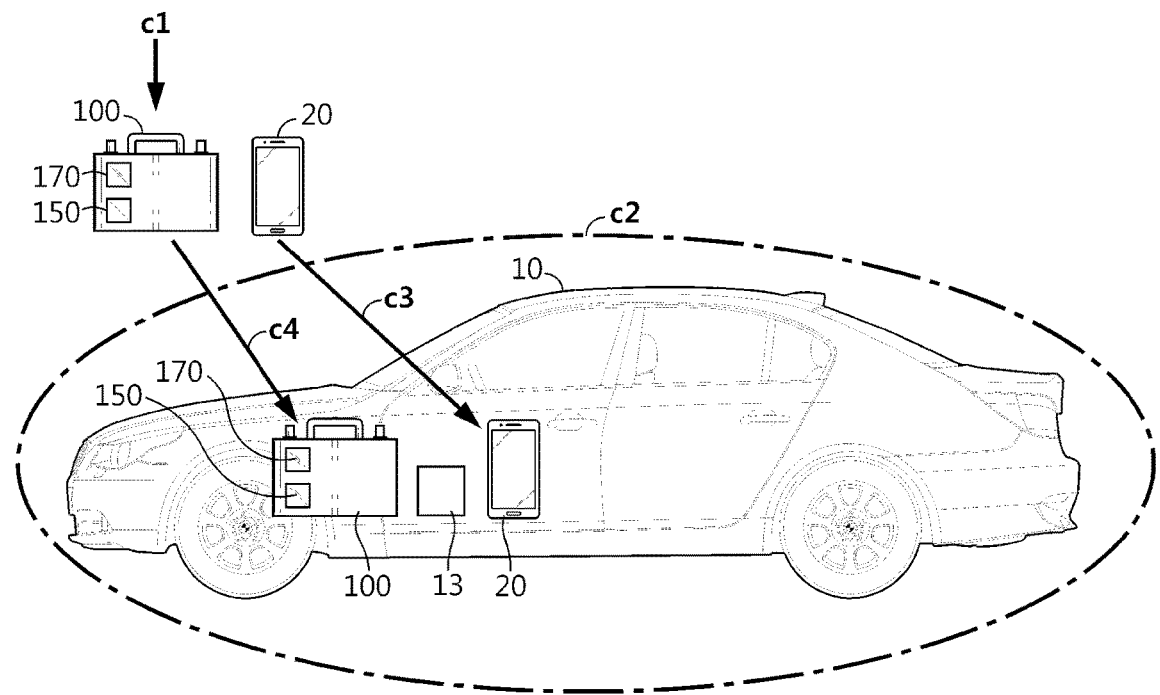
FIG. 5 is a diagram schematically showing a location from the battery pack according to an embodiment of the present disclosure to the vehicle and the portable terminal.

FIG. 5 is a diagram schematically showing a location from the battery pack 100 according to an embodiment of the present disclosure to the vehicle 10 and the portable terminal 20.

Referring to FIG. 5, the processor 160 may be configured to operate the memory reader unit 150 when the portable terminal 20 is located in a predetermined specific region or area. More specifically, first, if the portable terminal 20 is located at a point c1, the processor 160 may prevent the memory reader unit 150 from operating. Therefore, if the portable terminal 20 is located at the point c1, the memory reader unit 150 may not perform an operation to read the information of the vehicle memory 13. Then, if the portable terminal 20 is located in the area c2, the processor 160 receives the location information of the portable terminal 20 through the terminal communication unit 170 and may control the memory reader unit 150 to operate. Therefore, when the portable terminal 20 is located in the area c2, the memory reader unit 150 may perform an operation to read the information of the vehicle memory 13. For example, the area c2 may be set as the inner space of the vehicle 10. At this time, the processor 160 may control the memory reader unit 150 not to operate when the portable terminal 20 is located outside the vehicle 10 and control the memory reader unit 150 to operate when the portable terminal 20 is located inside the vehicle 10.

According to this configuration of the present disclosure, unnecessary operation of the memory reader unit 150 may be prevented. In particular, the portable terminal 20 is usually possessed by the user, for example the driver of the vehicle 10. In addition, the exchange-type battery pack 100 may also be transported directly by the user. Therefore, it may be regarded that the location of the portable terminal 20 and the location of the battery pack 100 are almost the same. That is, the processor 160 may estimate the location of the battery pack 100 through the location information received from the portable terminal 20. Therefore, if the location of the portable terminal 20 is far from the vehicle 10, it may be considered that the battery pack 100 is also far away from the vehicle 10. Meanwhile, if the location of the portable terminal 20 is located close to the vehicle 10, it may be estimated that the battery pack 100 is also located close to the vehicle 10. For example, in the configuration of FIG. 5, if it is determined that the portable terminal 20 moves like an arrow c3, it may be estimated that the battery pack 100 also moves in the same way as an arrow c4. Therefore, if the location of the portable terminal 20 is not at a certain point, the battery pack 100 is also considered not to be located at a certain point, and the memory reader unit 150 may not operate to prevent unnecessary power consumption by the memory reader unit 150. That is, according to this embodiment, by allowing the memory reader unit 150 to operate only when the battery pack 100 is highly likely to be mounted to the vehicle 10, it is possible to allow the memory reader unit 150 to efficiently operate.

Moreover, in many cases, the portable terminal 20 such as a smartphone includes a device capable of searching for location information, such as a GPS module, an NFC module, a WiFi module, and a Bluetooth module. In addition, the portable terminal 20 is possible to communicate with the vehicle 10 in various ways. Accordingly, the processor 160 may easily receive and figure out the relative location information of the portable terminal 20 with respect to the vehicle 10 by using a location search device or a communication device generally provided in the portable terminal 20 as described above.

In addition, the processor 160 may be configured to control the operation of the memory reader unit 150 by further considering a relative distance between the portable terminal 20 and the battery pack 100. That is, the processor 160 may be configured to consider not only the relative distance between the portable terminal 20 and the vehicle 10, but also the relative distance between the portable terminal 20 and the battery pack 100. This will be described in more detail with reference to FIG. 6.

Figure 6:
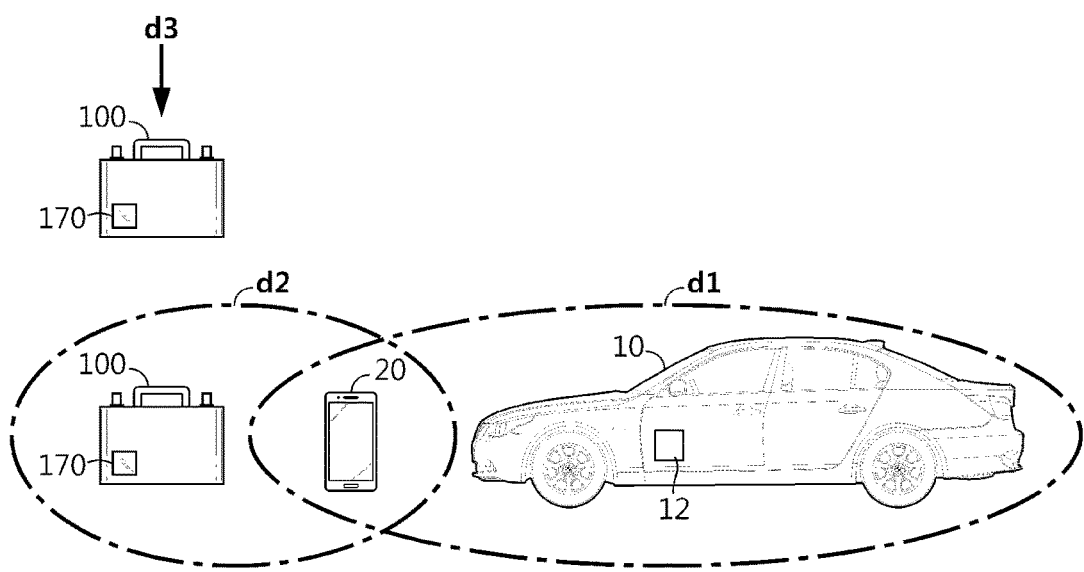
FIG. 6 is a diagram schematically showing relative locations from the battery pack according to another embodiment of the present disclosure to the vehicle and the portable terminal.

FIG. 6 is a diagram schematically showing relative locations from the battery pack 100 according to another embodiment of the present disclosure to the vehicle 10 and the portable terminal 20. In FIG. 6, it may be regarded that a dotted line represents an area within a predetermined distance to the battery pack 100 and the vehicle 10 from the portable terminal 20.

Referring to FIG. 6, the portable terminal 20 is located within the area indicated by d1, and it may be regarded that the portable terminal 20 is located within a certain distance from the vehicle 10. In addition, if the battery pack 100 is located within an area d2, it may be regarded that the portable terminal 20 and the battery pack 100 are also located within a certain distance. At this time, the processor 160 may be configured to operate the memory reader unit 150 when the relative distance between the portable terminal 20 and the battery pack 100 is within a certain distance and the distance between the portable terminal 20 and the vehicle 10 is within a certain distance.

Meanwhile, if the battery pack 100 is located at a point d3 outside the area d2, it may not be considered that the portable terminal 20 and the battery pack 100 are located within a certain distance. In this case, although the relative distance between the portable terminal 20 and the battery pack 100 is within a certain distance, the processor 160 may control the memory reader unit 150 not to operate.

Here, the relative distance between the portable terminal 20 and the battery pack 100 may be determined based on whether short-distance communication is maintained or not between the portable terminal 20 and the battery pack 100. That is, the processor 160 may determine that the portable terminal 20 and the battery pack 100 are located within a certain distance from each other in a state where the local area network between the portable terminal 20 and the terminal communication unit 170 is maintained, for example in a state where the Bluetooth pairing is maintained. Meanwhile, if the Bluetooth pairing is released, the processor 160 may determine that the portable terminal 20 and the battery pack 100 are not located within a certain distance. In addition, the relative distance between the portable terminal 20 and the battery pack 100 may be determined in various ways known at the time of filing of this application.

According to this configuration of the present disclosure, since the location of the battery pack 100 is estimated through the location of the portable terminal 20 in a state where the portable terminal 20 is located in a short distance from the battery pack 100, a more accurate location of the battery pack 100 may be estimated. Therefore, if only the portable terminal 20 is located near the vehicle 10 and the battery pack 100 is not located near the vehicle 10, the memory reader unit 150 may be controlled not to operate. Therefore, unnecessary operation or resource consumption of the memory reader unit 150 may be more reliably prevented.

In addition, the battery pack 100 may further include a location recognition unit 180 as shown in FIG. 1.

The location recognition unit 180 may be configured to recognize the location of the battery pack 100. In particular, the battery pack 100 may be configured to recognize a relative location with the vehicle 10. To this end, the battery pack 100 may be configured to recognize a location relative to the location of the vehicle 10 by including various devices capable of recognizing the location, for example a GPS module. Alternatively, the location recognition unit 180 may be configured to recognize a certain part or device provided in the vehicle 10. For example, the location recognition unit 180 may be configured to recognize an RFID tag or an NFC tag attached to the vehicle 10.

If the location recognition unit 180 recognizes the location of the battery pack 100, particularly the relative location of the battery pack 100 and the vehicle 10, as above, the processor 160 may be configured to control the operation of the memory reader unit 150 based on the location information. This will be described in more detail with reference to FIG. 7.

Figure 7:
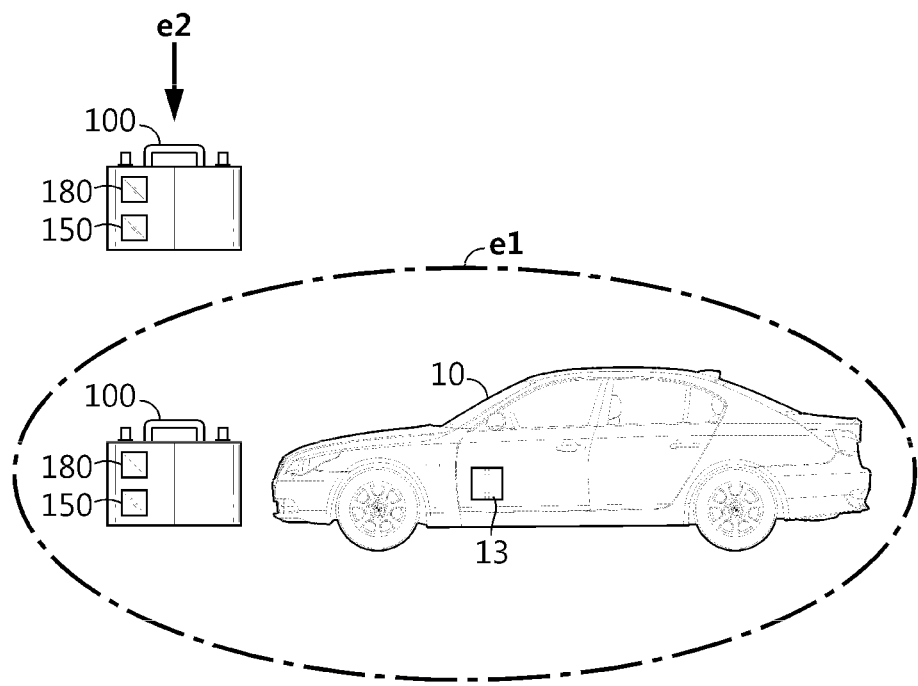
FIG. 7 is a diagram schematically showing a relative location relationship from a battery pack according to still another embodiment of the present disclosure to the vehicle.

FIG. 7 is a diagram schematically showing a relative location relationship from a battery pack 100 according to still another embodiment of the present disclosure to the vehicle 10.

Referring to FIG. 7, the battery pack 100 may be configured to recognize relative locations of the battery pack 100 and the vehicle 10 by including the location recognition unit 180. For example, in the drawing, if a portion where the distance between the vehicle 10 and the battery pack 100 is within a certain distance is an area indicated by a dotted line e1, the location recognition unit 180 may recognize whether the battery pack 100 is located within the area e1. In addition, if the location recognition unit 180 recognizes that the battery pack 100 is located within the area e1, the location information may be transmitted to the processor 160. In addition, the processor 160 may control the memory reader unit 150 to turn on. Meanwhile, if the location recognition unit 180 recognizes that the battery pack 100 is located at a point outside the area e1, for example at a point e2, the processor 160 may control the memory reader unit 150 not to turn on. That is, the processor 160 may control the memory reader unit 150 to operate only when the battery pack 100 is within a predetermined area so that the memory reader unit 150 reads the charging information of the vehicle memory 13.

According to this configuration of the present disclosure, it is possible to prevent unnecessary operation of the memory reader unit 150. Moreover, in this embodiment, since the location of the battery pack 100 may be recognized by itself, there is no need to perform indirect location estimation through communication with the portable terminal 20. Also, in this case, since the battery pack 100 directly recognizes its location, the relative location with the vehicle 10 may be more accurately estimated.

Meanwhile, in the embodiment of FIGS. 6 and 7, it has been described that the operation of the memory reader unit 150 is controlled through the recognition of location of the portable terminal 20 or the battery pack 100, but the operation of the switching unit 140 may also be controlled through the recognition of location of the portable terminal 20 or the battery pack 100. In particular, the processor 160 may be configured to turn on the switching unit 140 only when the portable terminal 20 or the battery pack 100 is recognized within a predetermined distance from the vehicle 10.

For example, in the configuration of FIG. 7, the switching unit 140 may be turned on only when the battery pack 100 is located within the area e1, and the switching unit 140 may not be turned on when the battery pack 100 is located outside the area e1, for example at the point e2. That is, the processor 160 may turn on the switching unit 140 only when the location recognition unit 180 recognizes that the relative distance of the battery pack 100 to the vehicle 10 is within a certain distance. In addition, when the location recognition unit 180 recognizes that the relative distance of the battery pack 100 to the vehicle 10 is not within the certain distance, the switching unit 140 may not be turned on. Here, the certain distance may be a distance with which it may be considered that the battery pack 100 is mounted to the vehicle 10 or just before being mounted to the vehicle 10, and may be appropriately set by a manager.

According to this configuration of the present disclosure, since the switching unit 140 is turned on only when the battery pack 100 is within a predetermined distance from the vehicle 10, an electric shock accident of the user such as a driver by the battery pack 100 may be prevented. In addition, when the user mounts the battery pack 100 to the vehicle 10, it is possible to prevent sparks from occurring when the battery pack 100 is connected to the connection terminal 14 of the vehicle 10 as a power is supplied to the power supply terminal 120 in advance.

Moreover, in the above embodiment, when the location recognition unit 180 recognizes that the relative distance of the battery pack 100 to the vehicle 10 is within a certain distance, the processor 160 may be configured not to turn on the switching unit 140 immediately but to turn on the switching unit 140 after a predetermined time. For example, when the location recognition unit 180 recognizes that the relative distance to the battery pack 100 is within a certain distance, the processor 160 may turn on the switching unit 140 after 20 seconds from the recognition time of the location recognition unit 180.

According to this configuration of the present disclosure, it is possible to secure a time for the user to stably fasten the battery pack 100 to the vehicle 10. Accordingly, it is possible to more effectively prevent an electric shock accident of the driver and sparks during connection.

Also, the processor 160 may be configured to control charging of the auxiliary battery 11 based on the charging information of the auxiliary battery 11. That is, the memory reader unit 150 may read the charging information of the auxiliary battery 11 stored in the vehicle memory 13 and transmit the charging information to the processor 160. In addition, the processor 160 may control various charging conditions for the auxiliary battery 11 based on the charging information of the auxiliary battery 11. In particular, the processor 160 may be configured to control at least one of a charging time, a charging amount, a charging voltage, and a charging current of the auxiliary battery 11.

For example, the memory reader unit 150 may read information such as SOC (State Of Charge), an appropriate charging voltage, and an appropriate charging current of the auxiliary battery 11 from the vehicle memory 13. In addition, this information may be transmitted to the processor 160. Then, the processor 160 may control the switching unit 140 or a converter based on the information such as the SOC, the appropriate charging voltage and the appropriate charging current to adjust the charging time, the charging amount, the magnitude of the voltage and current supplied to the auxiliary battery 11, or the like.

According to this configuration of the present disclosure, based on the charging information of the auxiliary battery 11 stored in the vehicle memory 13, appropriate charging conditions may be automatically set from the battery pack 100 to supply a charging power in an optimized form to the auxiliary battery 11. Accordingly, depending on the state, type, specification, or the like of the auxiliary battery 11, the auxiliary battery 11 may be charged under the optimal condition by the battery pack 100 itself, even without a separate command from the manager or the user.

Also, the memory reader unit 150 may read the charging information or the like of the auxiliary battery 11 from the vehicle memory 13 while the auxiliary battery 11 is being charged. In addition, the information read as above may be transmitted to the processor 160, and the processor 160 may be configured to appropriately change the charging conditions or the like by reflecting the changed state while the auxiliary battery 11 is being charged. Accordingly, in this case, it is possible to adaptively cope with the change in the charging situation of the auxiliary battery 11 so that the auxiliary battery 11 is charged under more suitable conditions.

The battery pack 100 according to the present disclosure may be configured to be detachably attached to the vehicle 10. In addition, the battery pack 100 according to the present disclosure may read information of the vehicle memory 13 when being mounted to the vehicle 10, and if the auxiliary battery 11 is discharged, the battery pack 100 may firstly supply a power to the auxiliary battery 11 so that the vehicle control unit 12 operates normally. In addition, after the vehicle control unit 12 comes into a state of operating normally, a driving power for driving the vehicle 10 may be supplied from the battery cell 110 to the motor 15. This will be described in more detail with reference to FIG. 8.

Figure 8:
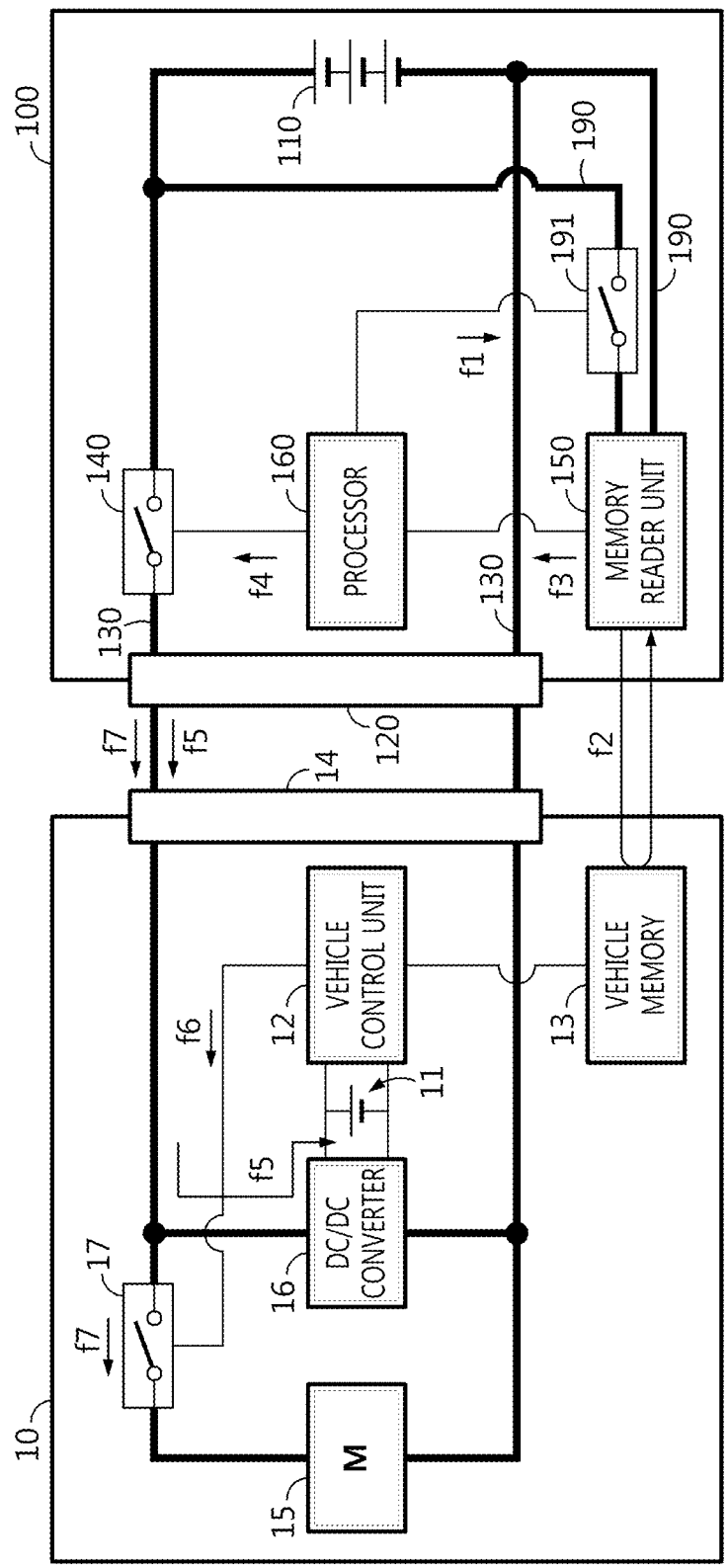
FIG. 8 is a diagram schematically showing a connection and operation configuration of the battery pack according to an embodiment of the present disclosure and the vehicle.

FIG. 8 is a diagram schematically showing a connection and operation configuration of the battery pack 100 according to an embodiment of the present disclosure and the vehicle. Even in this embodiment, features different from the former embodiment will be described in detail, and features identical or similar to those of the former embodiment will not be described in detail.

Referring to FIG. 8, the battery pack 100 according to the present disclosure may include a reader power path 190 provided between the battery cell 110 and the memory reader unit 150 so that an operating power may be supplied from the battery cell 110 to the memory reader unit 150. At this time, a reader switch 191 may be provided on the reader power path 190 to selectively open or close the reader power path 190. In addition, the vehicle 10 may include a motor switch 17 for selectively opening and closing the corresponding path on a driving power path 132 between the connection terminal 14 and the motor 15.

In this configuration, if the battery pack 100 according to the present disclosure is mounted to the vehicle 10, the processor 160 may turn on the reader switch 191 located between the battery cell 110 and the memory reader unit 150, as indicated by an arrow f1. In this case, as described above, the processor 160 may first check whether communication with the vehicle control unit 12 is made before turning on the reader switch 191. If the reader switch 191 is turned on as above, a power may be supplied from the battery cell 110 to the memory reader unit 150 so that the memory reader unit 150 may operate. Accordingly, the memory reader unit 150 may read the charging information of the auxiliary battery 11 stored in the vehicle memory 13, as indicated by an arrow f2. At this time, when it is read that the SOC of the auxiliary battery 11 is below a certain level, namely in a fully discharged state, this information may be transmitted to the processor 160 as indicated by an arrow f3. Then, as indicated by an arrow f4, the processor 160 may turn on the switching unit 140 to supply a power from the battery cell 110 to the auxiliary battery 11 as indicated by an arrow f5. Accordingly, the auxiliary battery 11 may be charged, and the vehicle control unit 12 may operate normally due to the charging of the auxiliary battery 11.

In a state where the vehicle control unit 12 may operate normally as above, if the driver (user) starts the vehicle, the vehicle control unit 12 may turn on the motor switch 17 located on the power path between the connection terminal 14 and the motor 15 as indicated by an arrow f6. Then, as indicated by an arrow f7, a driving power may be supplied from the battery cell 110 to the motor 15.

Meanwhile, in the various former embodiments, there is mainly illustrated that a power is supplied to the auxiliary battery 11 and the motor 15 through a common power supply path 130 and a common power supply terminal 120 included in the battery pack 100, but the present disclosure is not necessarily limited to these embodiments.

Figure 9:
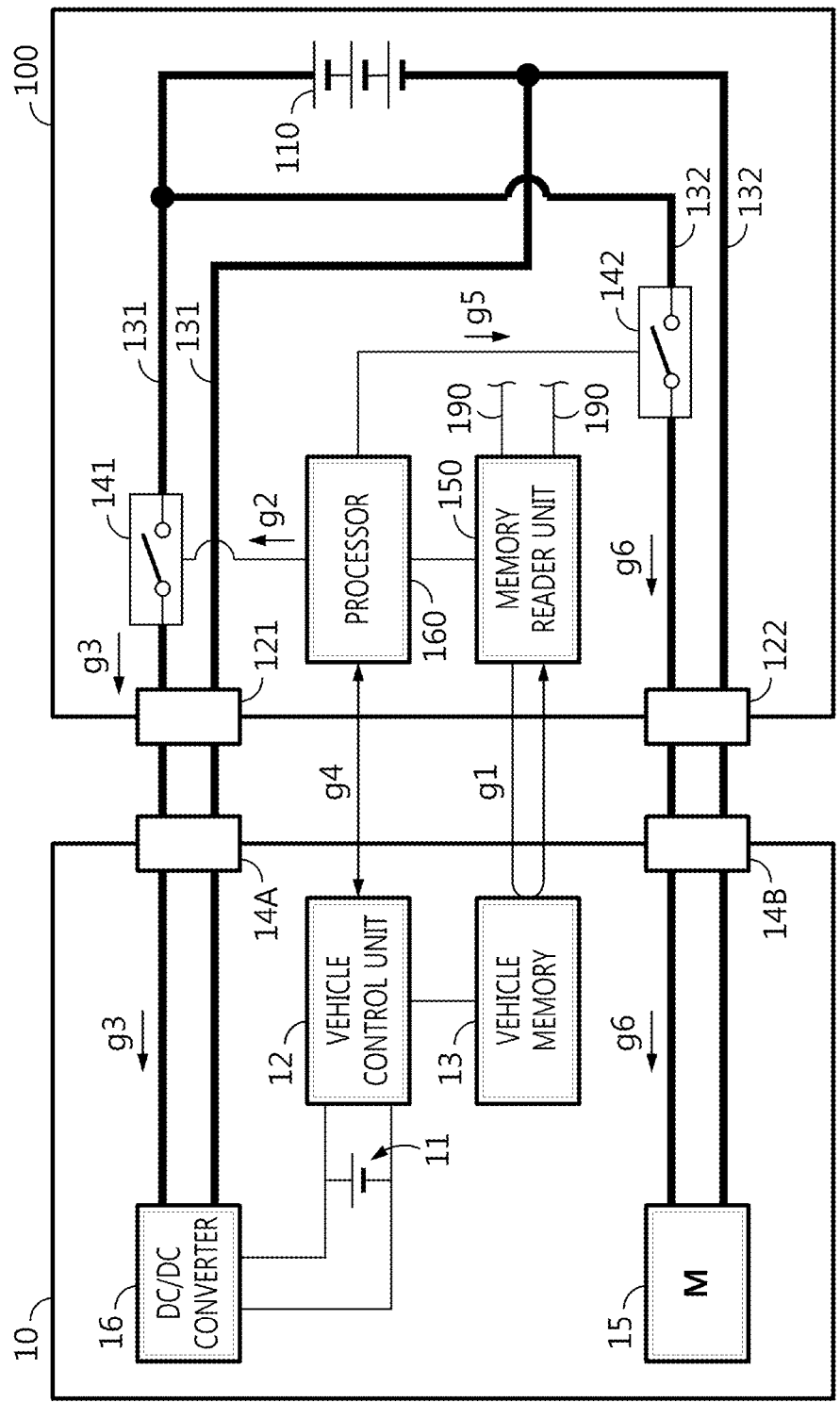
FIG. 9 is a diagram schematically showing a connection and operation configuration of the battery pack according to another embodiment of the present disclosure and the vehicle.

FIG. 9 is a diagram schematically showing a connection and operation configuration of the battery pack 100 according to another embodiment of the present disclosure and the vehicle 10. Even in this embodiment, features different from the former embodiment will be described in detail, and features identical or similar to those of the former embodiment will not be described in detail.

Referring to FIG. 9, in the battery pack 100 according to the present disclosure, the power supply terminal 120 may include a charging power terminal 121 and a driving power terminal 122. Here, the charging power terminal 121 may be configured to be connectable to a connection terminal 14A of the auxiliary battery 11 provided in the vehicle 10. In addition, the driving power terminal 122 may be configured to be connectable to a connection terminal 14B of the motor 15. For example, the charging power terminal 121 and the driving power terminal 122 may have shapes and specifications corresponding to the connection terminal 14A of the auxiliary battery 11 and the connection terminal 14B of the motor 15, respectively.

Also, the power supply path 130 may include a charging power path 131 and a driving power path 132. Here, the charging power path 131 may be a path connected between the battery cell 110 and the charging power terminal 121 and configured to supply a charging power to the auxiliary battery 11. Accordingly, the auxiliary battery 11 may receive the charging power from the battery cell 110 via the charging power path 131, the charging power terminal 121 and the connection terminal 14A. In addition, the driving power path 132 may be a path connected between the battery cell 110 and the driving power terminal 122 and configured to supply a driving power to the motor 15. Accordingly, the motor 15 may receive the driving power from the battery cell 110 via the driving power path 132, the driving power terminal 122 and the connection terminal 14B.

In this configuration, the switching unit 140 may include a charging switching unit 141 and a driving switching unit 142. Here, the charging switching unit 141 may be provided on the charging power path 131 to switch whether or not to supply a charging power. For example, if the charging switching unit 141 is turned on, the charging power path 131 may be maintained in a connected state, so that a charging power may be supplied from the battery cell 110 to the auxiliary battery 11. In addition, the driving switching unit 142 may be provided on the driving power path 132 and configured to switch whether or not to supply a driving power. For example, if the driving switching unit 142 is turned on, the driving power path 132 may be maintained in a connected state, so that a driving power may be supplied from the battery cell 110 to the motor 12. In this case, the charging switching unit 141 and the driving switching unit 142 may be turned on or off under the control of the processor 160.

More specifically, as indicated by an arrow g1, if the memory reader unit 150 recognizes from the vehicle memory 13 that the auxiliary battery 11 is discharged, this information may be transmitted to the processor 160. Then, the processor 160 may turn on the charging switching unit 141 as indicated by an arrow g2. In this case, as indicated by an arrow g3, a charging power may supplied from the battery cell 110 to the auxiliary battery 11 to charge the auxiliary battery 11. In addition, by charging the auxiliary battery 11, the vehicle control unit 12 may operate normally. In particular, the vehicle control unit 12 and the processor 160 may communicate with each other, as indicated by an arrow g4. In this case, if the driver starts the vehicle, the request signal may be transmitted to the processor 160. In addition, the processor 160 may turn on the driving switching unit 142 as indicated by an arrow g5. Accordingly, as indicated by an arrow g6, a driving power may be supplied from the battery cell 110 to the motor 15 so that the vehicle 10 runs.

According to this configuration of the present disclosure, a separate switch may not be provided between the auxiliary battery 11 and/or the motor 15 of the vehicle 10 and the connection terminals 14A, 14B. That is, according to this embodiment, a power may be selectively supplied to the auxiliary battery 11 and/or the motor 15 through the switch control of the battery pack 100 itself, without separately controlling the switch by the vehicle control unit 12 of the vehicle 10. Accordingly, since the battery pack 100 determines whether or not to supply a charging power or a driving power regardless of whether a switch is provided on the power path of the vehicle 10, compatibility of the battery pack 100 may be further improved.

In addition, according to this embodiment, a power may be supplied to the charging power terminal 121 and the driving power terminal 122 after the step in which the memory reader unit 150 reads the vehicle memory 13. That is, before the reading step by the memory reader unit 150, the charging power terminal 121 and the driving power terminal 122 may not be activated. Accordingly, the problem of an electric shock accident occurring through the terminals provided in the battery pack 100 may be reduced. In particular, a very large voltage or current may be applied to the driving power terminal 122 that supplies a driving power from the battery pack 100 to the motor 15. However, in this embodiment, since the driving power terminal 122 is activated after the reading operation of the memory reader unit 150 and normal communication with the vehicle control unit 12, the effect of preventing an electric shock according to the activation of the driving power terminal 122 may be further improved.

Meanwhile, although not shown in the drawings, the battery pack 100 according to the present disclosure may further include a mounting recognition unit configured to recognize that the battery pack 100 is mounted to the vehicle 10.

The mounting recognition unit may be configured to recognize whether the battery pack 100 is mounted in various ways, such as a wireless communication method or a mechanical fastening method with the vehicle 10. For example, an RFID tag or an NFC tag may be provided at a battery pack mounting location of the vehicle 10, and the mounting recognition unit may be implemented in the form of an RFID reader or an NFC reader capable of recognizing the RFID tag or the NFC tag. In this case, if the battery pack 100 is properly placed at the mounting location of the vehicle 10, the distance between the mounting recognition unit and the corresponding tag comes within a recognition distance, so that the mounting recognition unit may recognize that the battery pack 100 is mounted to the vehicle 10. In addition, the mounting recognition unit may be configured to recognize that the battery pack 100 is mounted to the vehicle 10 in a variety of other ways. For example, the mounting recognition unit may include an acceleration sensor and be configured to recognize whether the battery pack 100 is mounted or not by using an acceleration measurement value by the acceleration sensor.

In addition, if the mounting recognition unit recognizes that the battery pack 100 is normally mounted as above, this information may be transmitted to the processor 160. At this time, after the normal mounting is recognized, the processor 160 may be configured to perform various operations, such as the communication operation with the vehicle control unit 12 as shown in FIG. 3 (the arrow a2), the reading command of the memory reader unit 150 (the arrow a3) and/or the turning-on operation (the arrow a6) of the switching unit 140.

According to this embodiment of the present disclosure, after the battery pack 100 is normally mounted to the vehicle 10, it is possible to perform the communication operation between the processor 160 and the vehicle control unit 12, the reading operation of the memory reader unit 150, and/or the supply of power from the battery cell 110 to the auxiliary battery 11. Accordingly, unnecessary operation or power consumption of various components of the battery pack 100 may be reduced, and an electric shock accident or the like may be more effectively prevented.

A vehicle 10 according to the present disclosure may include the battery pack 100 according to the present disclosure described above. In particular, the vehicle 10 according to the present disclosure may be configured so that an exchangeable battery pack 100 is mounted thereto, as described in the various embodiments. In addition, the vehicle 10 according to the present disclosure may further include other devices, such as the vehicle control unit 12, the auxiliary battery 11, the motor 15, the connection terminal 14 and the DC/DC converter 14 described above, or an inverter or the like provided at the driving power input terminal of the motor 15, in addition to the battery pack 100. In addition, the vehicle 10 according to the present disclosure may further employ various components of the vehicle known at the time of filing of this application.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

100: battery pack
110: battery cell
120: power supply terminal
121: charging power terminal, 122: driving power terminal
130: power supply path
131: charging power path, 132: driving power path
140: switching unit
141: charging switching unit, 142: driving switching unit
150: memory reader unit
160: processor
170: terminal communication unit
180: location recognition unit
190: reader power path
191: reader switch
10: vehicle
11: auxiliary battery
12: vehicle control unit
13: vehicle memory
14: connection terminal
15: motor
16: DC/DC converter
17: motor switch
20: portable terminal

What is claimed is:

1. A battery pack configured to be detachably attached to a vehicle driven by a motor to supply a driving power to the motor, and the vehicle includes a vehicle controller, an auxiliary battery for supplying an operation power to the vehicle controller, a vehicle memory for storing charging information of the auxiliary battery, and a connection terminal of the vehicle connected to the auxiliary battery and the motor, the battery pack comprising:
   a battery cell having at least one secondary battery;
   a power supply terminal configured to be connectable to the connection terminal;
   a power supply path located between the power supply terminal and the battery cell and configured to supply a power from the battery cell to the power supply terminal;
   a switch provided on the power supply path and configured to selectively turn on/off the power supply path;
   a memory reader configured to read charging information of the auxiliary battery stored in the vehicle memory by using the power of the battery cell; and
   a processor configured to control the switch to supply the power from the battery cell to the auxiliary battery, based on the charging information of the auxiliary battery read by the memory reader,
   wherein the processor is configured to communicate with the vehicle controller and to operate the memory reader to read the charging information stored in the vehicle memory when a response signal is not received from the vehicle controller after the battery pack is mounted to the vehicle based on the power not being supplied from the auxiliary battery to the vehicle control unit when the auxiliary battery is fully discharged.

2. The battery pack according to claim 1, wherein the memory reader is configured to read the charging information stored in the vehicle memory by allowing a driving current to flow in the vehicle memory.

3. The battery pack according to claim 2, wherein the memory reader is configured to supply an electromagnetic wave to the vehicle memory so that the driving current flows in the vehicle memory by electromagnetic induction and receive the charging information transmitted by the driving current.

4. The battery pack according to claim 1, further comprising:
   a terminal communicator configured to communicate with a portable terminal of a user.

5. The battery pack according to claim 4, wherein the processor is configured to turn on the switch after receiving a permission signal of the user through the terminal communicator.

6. The battery pack according to claim 5, wherein the processor is configured to turn on the switch after a predetermined delay time from when the permission signal of the user is received.

7. The battery pack according to claim 4, wherein the processor is configured to receive location information of the portable terminal from the terminal communicator and control an operation of the memory reader based on the received location information.

8. The battery pack according to claim 4, wherein the processor is configured to operate the memory reader when a distance between the portable terminal and the battery pack is within a first distance, and a distance between the portable terminal and the vehicle is within a second distance.

9. The battery pack according to claim 1, further comprising:
   a location recognizer configured to recognize a location of the battery pack,
   wherein the processor is configured to control an operation of the memory reader based on the location information recognized by the location recognizer.

10. The battery pack according to claim 1, wherein the processor is configured to control at least one of a charging time, a charging amount, a charging voltage and a charging current of the auxiliary battery based on the charging information read by the memory reader.

11. A vehicle, comprising the battery pack according to claim 1.

12. The battery pack according to claim 1, wherein the processor is configured to transmit a response request signal to the vehicle controller when the battery pack is mounted to the vehicle.

13. The battery pack according to claim 1, wherein, when the auxiliary battery is fully discharged, the processor controls the switch to turn on to supply the power from the battery cell to the auxiliary battery so that the vehicle control unit is operated normally.

* * * * *